Patented Jan. 15, 1929.

1,698,988

UNITED STATES PATENT OFFICE.

SIMEON ALEXANDER BOWMAN, OF ST. LOUIS, MISSOURI.

PISTON RING.

Application filed September 19, 1925, Serial No. 57,391. Renewed November 23, 1928.

My invention relates to improvements in piston rings and the object of the invention is to devise an improved piston ring particularly suitable for use in internal combustion engines whereby a more perfect operation may be obtained and whereby a snug and proper fit of the ring in the ring groove and against the cylinder is assured, thus more effectively preventing leakage past the ring; a further object is to provide a ring which is not likely to become jammed or wedged within the cylinder thus eliminating the resulting knocking and other troubles.

Further objects will appear in the course of the following specification.

My invention consists in the construction and arrangement of parts, all as hereinafter more particularly described and illustrated in the accompanying drawings in which:—

Fig. 1 is an enlarged longitudinal fragmentary section of a portion of a cylinder and piston therein with my improved ring fitted, the ring being shown in its original form when initially installed and before any wear has occurred.

Fig. 2 is a section taken similarly to Fig. 1 showing the portion of the ring after the initial wear has occurred.

Fig. 3 is a transverse section through a cylinder and piston therein, with my improved ring fitted, the section being taken on the line 3—3 of Fig. 2.

In the drawings, like characters of reference indicate corresponding parts in the various views.

My invention is applicable to any ordinary piston 1 having a circumferential ring groove 2 and mounted within a cylinder 3.

My improved ring comprises an inner ring section 4 and an outer ring section 5.

Each of these ring sections is narrower than the ring groove 2 and are of smaller diameter than the cylinder 3 so that normally the ring would slide loosely through the cylinder.

The ring sections are also made soft so that of themselves they have no resilient engagement against the cylinder wall.

The ring sections are formed with meeting faces 6 and 7 inclined at fifty degrees obliquely to the axis of the ring.

The oblique face 6 of the outer ring section 5 terminates at its bottom edge in a straight portion 8 disposed parallel to the plane of the ring and the oblique face 7 of the inner ring section 4 terminates at its bottom edge in a straight portion 9 also disposed parallel to the plane of the ring.

The portion 9 of the inner section 4 projects beyond the outer face of the outer section 5 and the under edge of the inner section is inclined away from the edge of this portion at 10 so that the outer peripheral edge of the inner section forms a thin circumferential ridge 11 projecting beyond the outer face of the outer section, the purpose of which will presently be explained.

A flat spring 12 is mounted within the ring groove 2 behind the inner ring section 4.

This spring is of peculiar shape having five long sides and five short sides alternating between the long sides.

Due to this form of the spring, it bears against the piston at five points 13 and against the inner ring section at 10 points 14, so that the ring will work upon the piston instead of upon the ring and will not wear through on the outer corners.

When my ring is initially installed, the outer ring section 5 is superimposed upon the inner ring section 4 and the spring 12 will expand the inner section so that the thin circumferential projecting ridge 11 is pressed against the cylinder wall, and since the normal diameter of the outer section 5 is less than that of the cylinder, when thus initially installed this outer section simply rests loosely upon the inclined face of the inner section but does not contact with the cylinder wall (see Fig. 1).

When initially installed the only portion of the entire ring which engages the cylinder wall is the thin circumferential ridge 11.

As a matter of fact when initially installed the outer section 5 lies quite loosely in the groove and is not pressed into engagement with either the wall of the ring groove or with the cylinder wall.

From the above it will be evident that when initially installed the outer section 5 is quite loose and when the engine is first run the oil may freely work up and around the ring sections.

As running continues the thin circumferential ridge 11 soon wears and this wear is immediately compensated for by the spring 12 expanding the inner ring section 4 and maintaining it pressed against the cylinder wall.

As this wear continues, with the resultant expansion of the inner ring section 4, the outer section 5 is expanded thereby so that the ring as a whole expands laterally to properly fill the ring groove and radially so that the outer face of the outer section 5 is pressed against the cylinder wall (see Fig. 2).

Thus as soon as the initial wear has taken place, the ring is expanded both laterally and radially to effectively and fully fill the ring groove and the outer ring section is pressed tightly against the cylinder wall to prevent any leakage past the ring.

As wear continues the ring will continue to automatically expand as required to compensate for all wear.

By the construction whereby the ring sections are normally of less diameter than the cylinder and whereby, when initially installed the outer section is quite loose in the ring groove and cylinder, the operation of fitting the piston into the cylinder is greatly facilitated.

Serious trouble is experienced in two piece piston rings due to the outer section being forced down over the inner section thus causing the sections to jam or wedge in the cylinder, resulting in knocking and other troubles.

In my improved ring this has been entirely overcome by the provision of the portions 8 and 9 which portions when the ring is installed are in juxtaposition and form opposed shoulders which come into engagement should the sections tend to slide unduly axially past each other.

By this means the extent to which the outer section can slide over the inner section is positively limited and jamming or wedging of the ring in the cylinder is positively prevented.

From the foregoing it will be evident that I have devised valuable improvements in piston rings whereby the objects of my invention have been attained.

What I claim as my invention is:

The combination with a cylinder and a piston therein having a circumferential ring groove, of a piston ring in said groove, said ring comprising two superimposed ring sections, the normal diameter of said ring sections being smaller than that of the cylinder bore and each section being narrower than the ring groove, a spring mounted within the groove behind the piston ring and expanding the ring outwardly, the meeting faces of the ring sections being formed with corresponding portions inclined obliquely to the axis of the ring, said inclined portions terminating at the bottom in juxtaposed portions parallel to the plane of the ring, and a circumferential ridge upon the inner ring section projecting beyond the outer section so that, when initially installed in the piston and cylinder, this ridge alone contacts with the cylinder wall.

SIMEON ALEXANDER BOWMAN.